May 5, 1964  T. D. VAN DOROS  3,131,961
HOISTING DEVICES
Filed April 23, 1962　　　　　　　　　　　　　　2 Sheets—Sheet 1
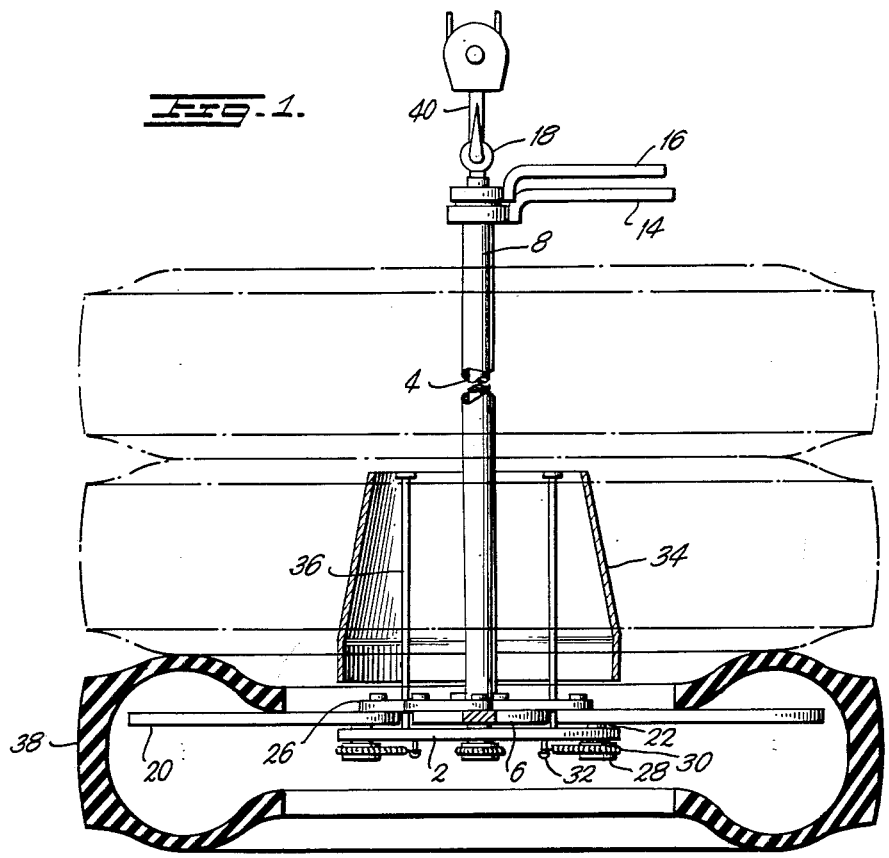
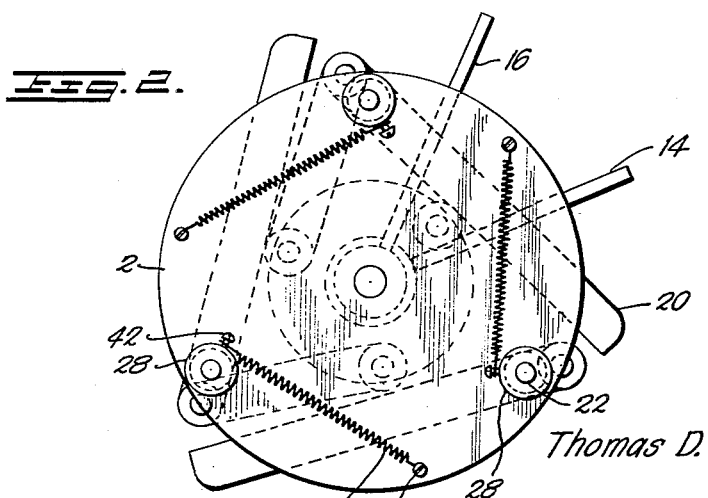
INVENTOR
*Thomas D. Van Doros*
BY *Kenon, Palmer, Stewart & Estabrook*
ATTORNEYS

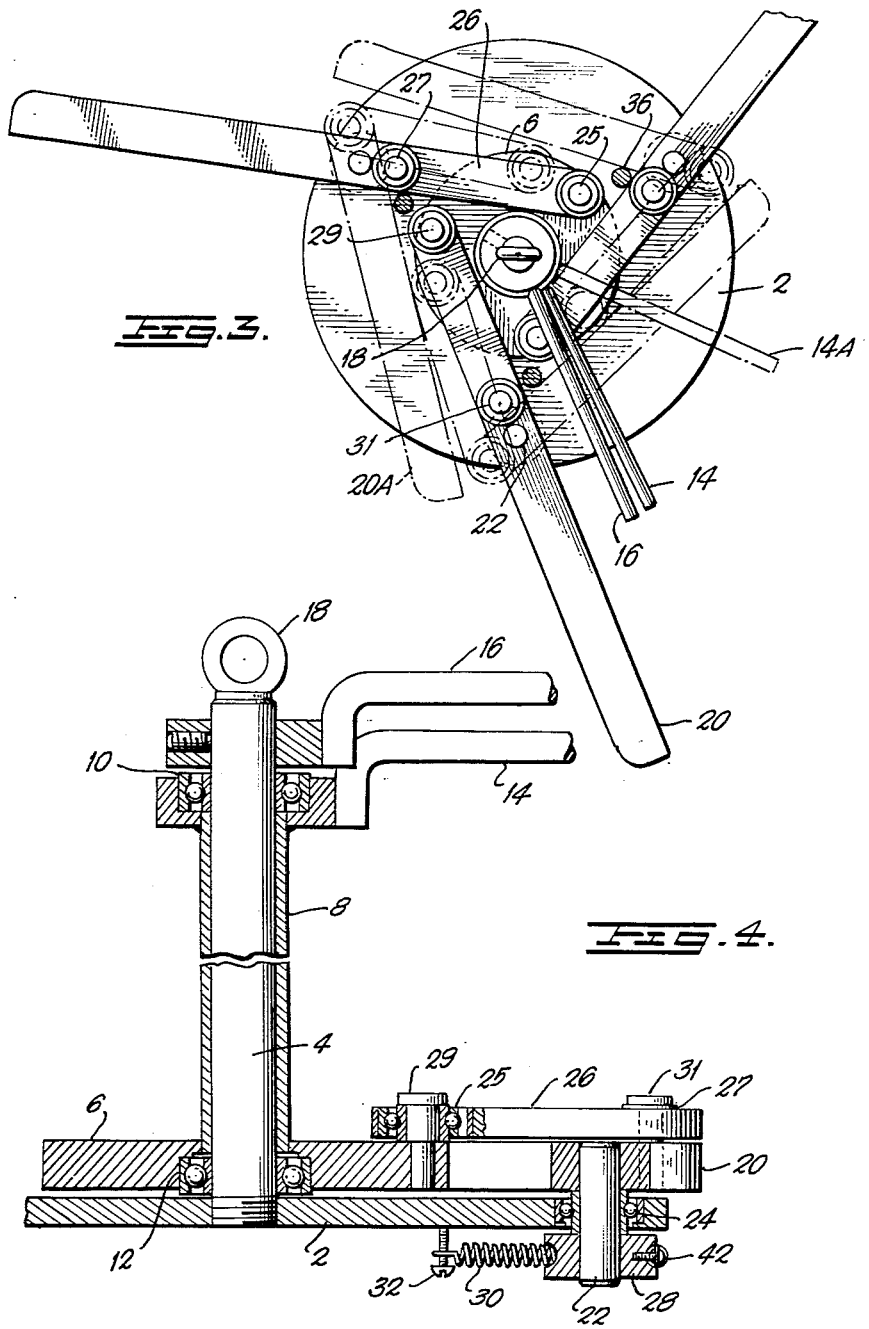

United States Patent Office 3,131,961
Patented May 5, 1964

3,131,961
HOISTING DEVICES
Thomas D. Van Doros, Akron, Ohio, assignor to The General Tire & Rubber Company, a corporation of Ohio
Filed Apr. 23, 1962, Ser. No. 189,639
7 Claims. (Cl. 294—83)

This invention relates to hoisting devices and, more particularly, to tire handling devices adapted to pick up and transport stacked vehicle tire casings or other annular objects.

Vehicle tire casings, because of their shape and composition, are inconvenient to handle and transport. This difficulty is compounded in situations where large quantities of these casings are handled as a routine course of business.

Heretofore, stacked tire casings have usually been handled by such methods as palletizing, lifting and transporting them with forklift trucks or the like or have been handled by external grappling means. These methods have the inherent disadvantage of requiring special handling devices and spaced or compartmentalized storage to provide access thereto.

This invention affords contiguous storing of stacks of vehicle tire casings or the like, without the use of pallets or other special storing media. This is accomplished by providing a mechanism for hoisting equipment which is biased in a retracted loading configuration, is insertable into the hollow core formed by the stacks and has arms extendible in a plane normal to the axis of the stack into a casing of the stack. The arms are retained in the extended configuration against the bias towards the retracted position by the weight of the tire casings, thereby providing automatic retraction of the arms when the weight is relieved therefrom.

An object of this invention is to overcome the disadvantages in tire handling as discussed above and to provide a novel grapple which may be economically manufactured and which is practical, efficient and simple in operation.

Another object of this invention is to provide a simple hoisting device which may be used in connection with existing hoists and the like equipment without modification thereto.

Still another object of this invention is to provide a hoist unit to take advantage of the inherent internal configuration of vehicle tire casings by engaging the interior of the casings during the hoisting thereof.

Yet another object of this invention is to provide a hoist unit which will allow close, contiguous placement of vehicle tire stacks by utilizing the interior of the tire stacks as the grappling surface.

Another object of this invention is to provide a hoisting device which will hold stacked tire casings for transport to a desired point and automatically release them in a stacked condition upon lowering of the tires to a supporting surface.

Other objects and many of the attendant advantages of this invention will be readily appreciated as the same becomes better understood by reference to the following detailed description when considered in connection with the accompanying drawings, in which like reference numbers designate like parts throughout the figures thereof and wherein:

FIG. 1 is a side view of a device embodying the principles of the invention showing the device in one of its intended uses;

FIG. 2 is a bottom plan view of the device in its retracted configuration;

FIG. 3 is a top plan view with the shield portion removed to show the mechanism of the device in its extended condition; and FIG. 4 is a cross-sectional enlarged side view of a portion of the device.

Referring now to FIG. 1, the device is composed of a circular flat plate 2, having a vertical shaft 4 connected to it at the center. A circular disc 6 is superimposed over plate 2 and has a tube 8 mounted to it and extending upward coaxial with shaft 4. The disc and tube are rotatably mounted to shaft 4. Handles 14 and 16 are attached to the top of tube 8 and shaft 4 respectively. Hoist hook engaging ring 18 is connected to the top of shaft 4. Arms 20 are rotatably mounted at the periphery of plate 2. Link members 26 pivotally connect the ends of arms 20 to disc 6. Pulleys 28 are connected to the lower ends of shafts 22. Springs 30 are connected to pulleys 28 at one end and to screws 32 at the other ends. The screws are in turn connected to plate 2. Shield 34 is connected at the top periphery to posts 36 which are in turn connected to plate 2. Cross-sectional tire casing 38 is shown engaging arms 20 of the device. Hoist hook 40 is shown engaging ring 18.

Referring now to FIG. 2, the device is shown in a lower plan view in a retracted condition. Springs 30 are shown connected to plate 2 through screws 32 and to pulleys 28 by screw 42.

Referring now to FIG. 3, the arms and handle of the device are shown in solid lines in the extended, tire-engaging position and in dotted lines in the retracted, loading position. Arms 20 represent the extended position and arms 20A represent the retracted position. Handle 14 is shown in solid lines indicating its position after the device has been operated to the extended configuration and at 14A in broken lines indicating its position angularly spaced from handle 16 when the device is in the retracted condition.

Referring now to FIG. 4, a portion of the device is shown partly in cross-section. Disc 6 and tube 8 are shown rotatably mounted to shaft 4 by bearings 10 and 12. Arms 20 are shown rotatably mounted to plate 2 through shaft 22 and bearing 24. The pivotal connection of link members 26 to arms 20 and disc 6 comprise bearings 25 and 27 and pins 29 and 31, respectively.

In operation, the device is suspended from some suitable hoisting mechanism such, for example, as an overhead transporting power hoist. The tires which are to be transported and stored or unstored and transported are normally arranged in stacked fashion. The device is introduced into the hollow core formed by these stacked tires by positioning the hoist over the stack and lowering the device therein. The number of tires to be transported can be selected by proper vertical positioning of the device within the stack. Upon reaching the desired vertical position the hoist operator extends arms 20 by squeezing handles 14 and 16 together. This rotates tube 8 and disc 6 with respect to plate 2 and swings the arms into the interior of the desired tire casing of the tire stack and also imparts tension in springs 30. Holding the handles in this position, the operator then raises the hoist, causing the arms to engage the upper interior wall of the selected tire casing thereby imposing the weight of that casing and the higher casings on the arms. The mechanism is so designed that the load on the arms will frictionally retain them in the extended position against the tension of springs 30. The hoist is then raised to a height necessary to clear obstructions and the tire casings are transported to the desired location. Upon reaching this location, the hoist is lowered until the engaged casing contacts a supporting surface whereon the stacked tires are intended to be deposited. Upon reaching this position, the load on arms 20 is released when the surface takes up the weight of the tires and springs 30 automatically retract the arms. The device then can be raised clear of the stack and returned to pick up another load. Shield 34 provides a guide to prevent the device from catching on the interior of the tires during removal.

It should be noted that simple electromechanical or pneumatic actuators could be substituted for handles 14 and 16 to allow complete remote control. Many similar mechanical modifications or substitutions could also be made such as, for example, the substitution of a single spring between shaft 4 and tube 8 for the individual springs 30 without varying the intent of the invention.

Although designed primarily for handling tires, utility of the device is not limited to this use, but it is applicable to many other objects having similar interior configuration, such as for example, stacked coils of wire, coiled sheet material, tubing, pipe and the like. Other modifications and variations of the present invention are also possible in the light of the above teachings.

I claim:

1. A hoisting device of the type adapted to pick up and support annular objects or the like which comprises in combination: a supporting means; a plurality of object engaging arms pivotally mounted to said supporting means, said arms adapted to swing in a coplanar relationship to one another, said arms also adapted to swing outwardly from said support to engage a surface of an annular object to be lifted, said arms being frictionally retained in the engaging position by the weight of the lifted objects; resilient means carried by said supporting means and automatically actuated on removal of said weight from said arms to swing said arms inwardly toward said support automatically when said weight is relieved therefrom; and means mounted on said supporting means to swing said arms outwardly simultaneously.

2. A hoisting device of the type adapted to pick up and support stacked vehicle tire casings or the like comprising in combination: a supporting means comprising a circular plate member substantially smaller than the minor diameter of said casings, a shaft member perpendicularly mounted to the top surface of said plate and disposed at the center thereof; more than two casing engaging arms pivotally mounted to the top surface of said plate and symmetrically disposed thereon, said arms adapted to swing in a coplanar relationship to one another, said arms also being adapted to swing outward of said plate from an initial loading position into an extended position engaging the interior of one of said casings, said arms further being retained in the extended position by the weight of said casings imposed thereon; means associated with each of said pivotal mountings to automatically retract said arms to the loading position when the weight is relieved therefrom; said arms each describing a cord length of said disc in the loading position; means to simultaneously extend said arms; shielding means mounted on said plate to guide said device vertically from the interior bore described by said stacked casings; and means associated with the top of said shaft to engage a lifting device.

3. A hoisting device in accordance with claim 2 wherein said means to simultaneously extend said arms comprises an annular disc rotatably mounted adjacent to the top of said plate to said shaft, said disc being substantially smaller in diameter than said plate, a cylindrical tube mounted to said disc and disposed to enclose said shaft for a portion of the length thereof, said tube being rotatably mounted to the top of said shaft, said tube and said disc also being coaxial with said shaft, a linking member associated with each of said arms and pivotally connected to one end thereof, the other end of said linking member being pivotally connected to said disc, means to rotate said tube with respect to said shaft thereby rotating said disc and swinging the connected ends of said arms inwardly through substantially longitudinal displacement of said linking members thereby swinging the other ends of said arms simultaneously outward to an extended casing engaging position.

4. A hoisting device in accordance with claim 3 wherein said means to rotate said tube with respect to said shaft comprises: a handle fixed to the unenclosed portion of said shaft and perpendicular to the longitudinal axis thereof; a similar handle fixed to said tube and perpendicular to the longitudinal axis thereof, said latter handle disposed adjacent to said first mentioned handle and angularly spaced therefrom, whereby the drawing of said handles together rotates said tube with respect to said shaft.

5. A hoisting device in accordance with claim 2 wherein said means to automatically retract said arm comprises: a shaft rotatably disposed through and depending below said plate at a point coaxial with the pivotal mounting of said arm, the upper end of said shaft being fixed to said arm, a pulley type wheel coaxially mounted on said shaft, a tension spring having one end fixed to said wheel and the other end fixed to said disc, said spring disposed to bias said arm in a retracted position thereby providing automatic retraction of said arm to the loading position when weight is relieved therefrom.

6. A hoisting device in accordance with claim 2 wherein said shielding means comprises: a frusto-conical shell having its larger diameter essentially equal to the diameter of said plate and disposed in spaced relationship and adjacent thereto.

7. A hoisting device of the type adapted to pick up and support annular objects or the like comprising in combination;

a supporting means;

a plurality of object engaging arms pivotally mounted on said supporting means, said arms adapted to swing in a coplanar relationship to one another, said arms also adapted to swing outwardly from said support to engage a surface of an annular object to be lifted, said arms being retained in the engaging position by the frictional force resulting from the weight of the object being lifted;

resilient means carried by said supporting means automatically actuated on removal of the weight of said object from said arms to swing said arms inwardly toward said support when said weight is relieved therefrom;

and means mounted on said supporting means to swing said arms outwardly simultaneously.

References Cited in the file of this patent

UNITED STATES PATENTS

| | | |
|---|---|---|
| 2,307,107 | Bryson | Jan. 5, 1943 |
| 2,486,489 | McDermott | Nov. 1, 1949 |
| 2,528,873 | Dorman | Nov. 7, 1950 |
| 2,811,067 | Greer | Oct. 29, 1957 |